COMPUTER EDITING AND PRINTING SYSTEM

Filed July 18, 1955 10 Sheets-Sheet 1

INVENTOR
Myron J. Mendelson
Carl Bernst
Louis A Kline
By John J. Matlago, Agent
His Attorneys

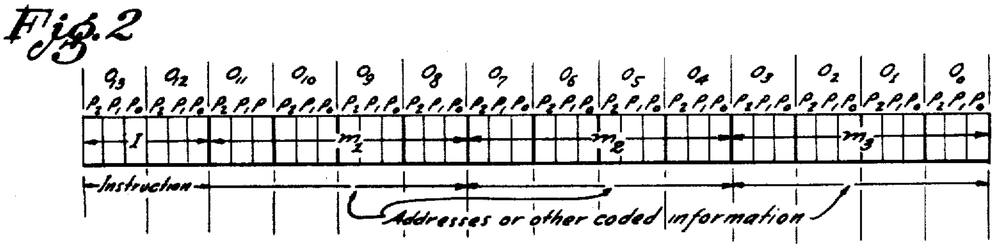

Fig. 2

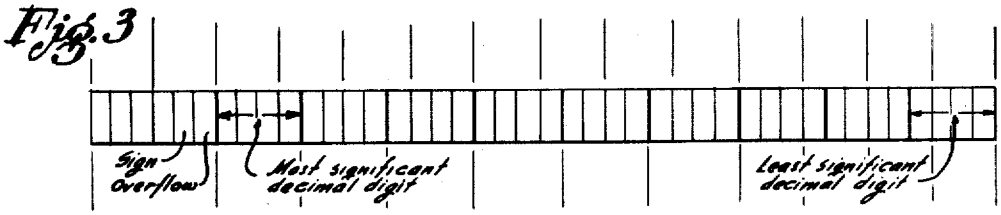

Fig. 3

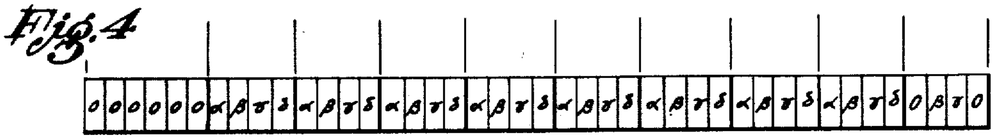
Fig. 4

Fig. 5

| Number Information | | E Register $O_{12}P_1$ | $O_{12}P_0$ |
|---|---|---|---|
| + | no overflow | 0 | 0 |
| + | overflow | 0 | 1 |
| − | no overflow | 1 | 0 |
| − | overflow | 1 | 1 |

Fig. 6

| Key Symbol | Significance |
|---|---|
| α = 1 | "Leave spaces instead of printing succeeding zeros" |
| β = 1 | "Print decimal point" |
| γ = 1 | "Tabulate" |
| δ = 1 | "Stop printing for this word" |

| Typewriter character to be printed | FLIP-FLOP CODE A6 | A5 | A4 | A3 | A2 | A1 |
|---|---|---|---|---|---|---|
| 0 | 0 | 0 | 0 | 0 | 0 | 0 |
| 1 | 0 | 0 | 0 | 0 | 0 | 1 |
| 2 | 0 | 0 | 0 | 0 | 1 | 0 |
| 3 | 0 | 0 | 0 | 0 | 1 | 1 |
| 4 | 0 | 0 | 0 | 1 | 0 | 0 |
| 5 | 0 | 0 | 0 | 1 | 0 | 1 |
| 6 | 0 | 0 | 0 | 1 | 1 | 0 |
| 7 | 0 | 0 | 0 | 1 | 1 | 1 |
| 8 | 0 | 0 | 1 | 0 | 0 | 0 |
| 9 | 0 | 0 | 1 | 0 | 0 | 1 |
| • (decimal point) | 0 | 1 | 1 | 1 | 1 | 0 |
| (Tab) | 0 | 1 | 1 | 1 | 0 | 0 |
| (Space) (positive sign, no overflow) | 0 | 1 | 1 | 1 | 0 | 1 |
| P (positive sign, overflow) | 1 | 1 | 0 | 1 | 0 | 1 |
| — (negative sign, no overflow) | 1 | 0 | 0 | 0 | 1 | 0 |
| N (negative sign, overflow) | 1 | 1 | 0 | 0 | 1 | 1 |

Fig. 7

INVENTOR:
Myron J. Mendelson
Hearl Benst
Louis A Kline
By John T. Matlago, Agent
His Attorneys.

INVENTOR.
Myron J. Mendelson
Earl Benoit
Louis A Kline
By John J. Matlago, Agent
His Attorneys.

INVENTOR:
Myron J. Mendelson
By Louis A Kline
John J. Matlago, Agent
His Attorneys.

Sept. 23, 1958 M. J. MENDELSON 2,853,696

COMPUTER EDITING AND PRINTING SYSTEM

Filed July 18, 1955 10 Sheets-Sheet 5

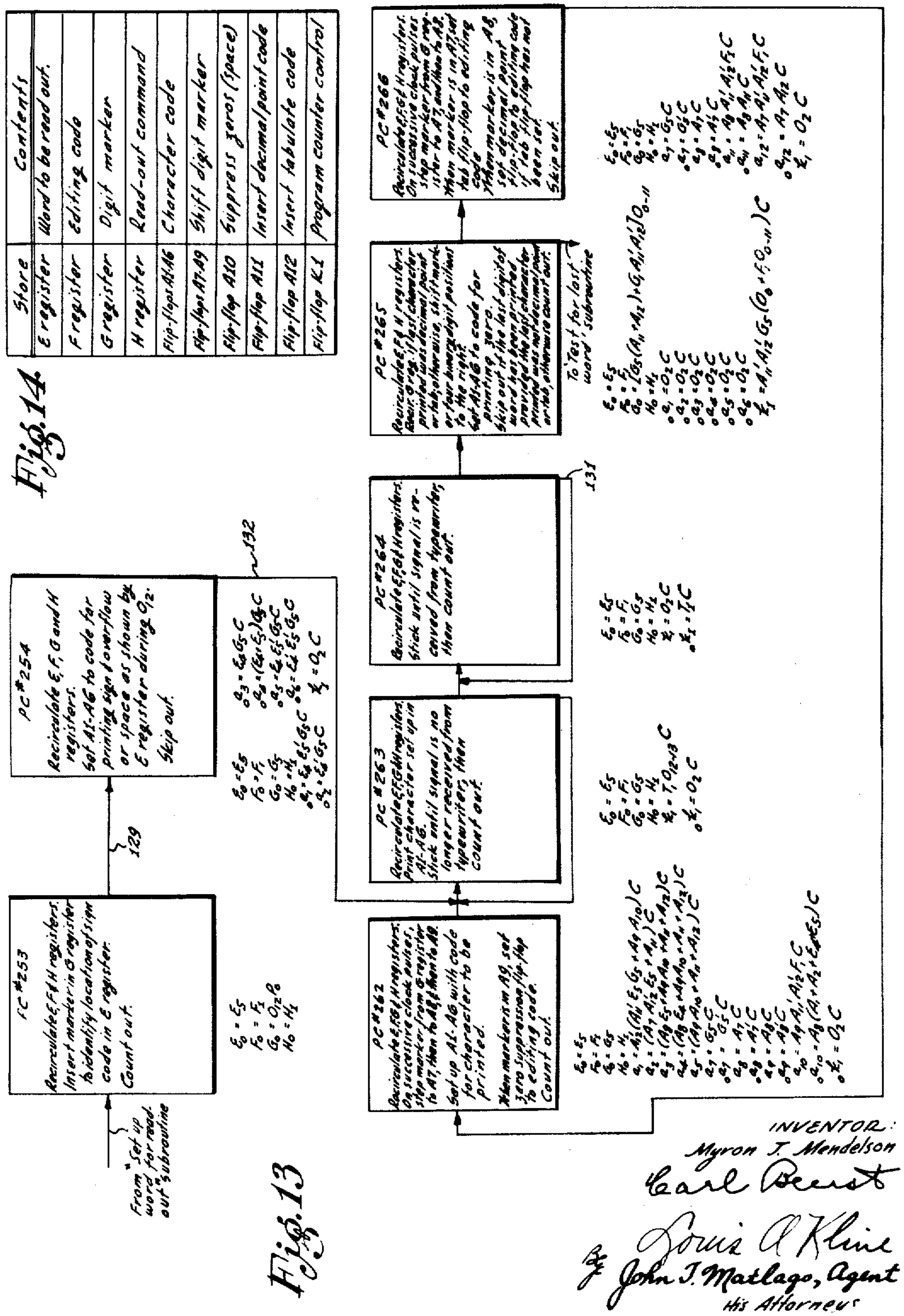

Fig. 13, Fig. 14

| Store | Contents |
|---|---|
| E register | Word to be read out. |
| F register | Editing code |
| G register | Digit marker |
| H register | Read-out command |
| Flip-flops A1-A6 | Character code |
| Flip-flops A7-A9 | Shift digit marker |
| Flip-flop A10 | Suppress zeros (space) |
| Flip-flop A11 | Insert decimal point code |
| Flip-flop A12 | Insert tabulate code |
| Flip-flop K1 | Program counter control |

INVENTOR:
Myron J. Mendelson

By Louis A Kline
John J. Matlago, Agent
His Attorneys

Fig. 16
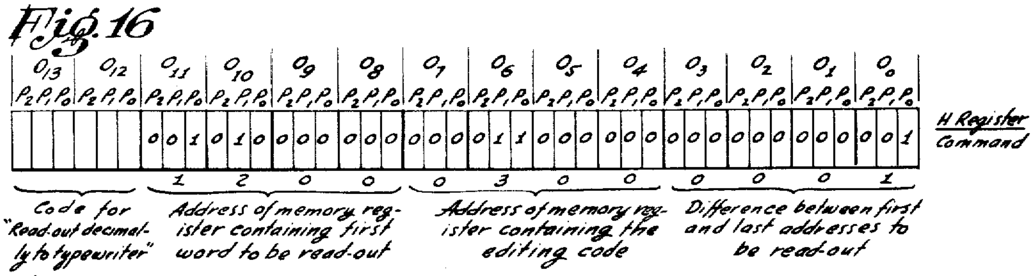
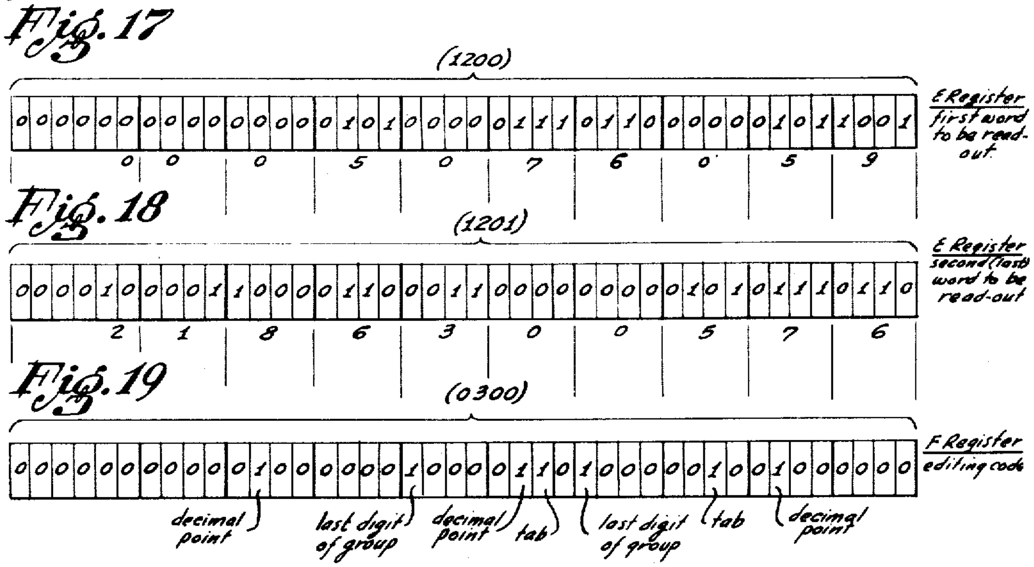
FIG. 17, FIG. 18, FIG. 19
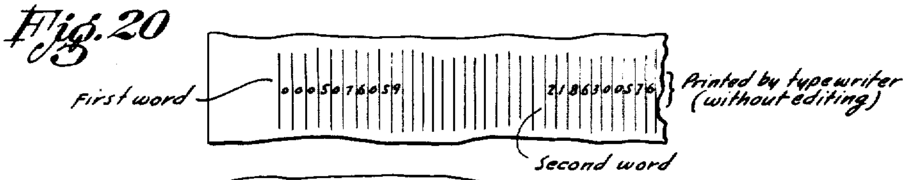
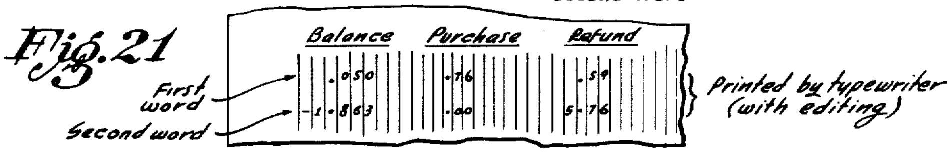
INVENTOR:
Myron J. Mendelson
By Louis A. Kline
John J. Matfago, Agent
His Attorneys.

INVENTOR:
Myron J. Mendelson
Carl Berst
By Louis A Kline
John J. Matlago, Agent
His Attorneys.

COMPUTER EDITING AND PRINTING SYSTEM

Filed July 18, 1955 10 Sheets-Sheet 8

INVENTOR:
Myron J. Mendelson
Carl Benst
By Louis A Kline
John J. Matlago, Agent
His Attorneys Sept. 23, 1958 M. J. MENDELSON 2,853,696

COMPUTER EDITING AND PRINTING SYSTEM

Filed July 18, 1955 10 Sheets-Sheet 9

INVENTOR:
Myron J. Mendelson
By Earl Beust
Louis A. Kline
John J. Matlago, Agent
His Attorneys

COMPUTER EDITING AND PRINTING SYSTEM

Filed July 18, 1955 10 Sheets-Sheet 10

INVENTOR:
Myron J. Mendelson
By John T. Matlago, Agent
His Attorneys 2,853,696
Patented Sept. 23, 1958

2,853,696

COMPUTER EDITING AND PRINTING SYSTEM

Myron J. Mendelson, Los Angeles, Calif., assignor to The National Cash Register Company, Dayton, Ohio, a corporation of Maryland Application July 18, 1955, Serial No. 522,455

12 Claims. (Cl. 340—173)

This invention relates to digital computer read-out routines and more particularly to a system which provides editing instructions to an electric typewriter as it receives digits of words from the computer.

Digital computers commonly require auxiliary equipment to present the results of arithmetic and othe operations performed. Automatic electric typewriters are among those most frequently employed since the information presented by such machines is in the form of numeric and alphabetic characters and other symbols easily understood by the operator. Additionally, some types of these machines translate the binary code of the computer to the decimal form, provide a synchronizing signal to control the computer program, and operate at high speeds desirable for cooperation with a computer.

The preferred embodiment of the present invention comprises means for accomplishing the transfer of information from the computer to the typewriter and is especially suitable for employment with a computer such as described in a co-pending application, Serial Number 325,144, filed December 10, 1952, and an automatic electric typewriter such as those commonly used as input-output equipment for a computer.

When information printed by the typewriter is in the form of decimal numerals, it has been customary to print a character for each decimal digit transmitted by the computer, regardless of the significance of a decimal digit. Thus, where a computer word comprising nine decimal digits and provision for sign and overflow conditions (both of the latter also being encoded by the computer) is received by the typewriter, a symbol for each decimal digit, for the sign and for the overflow, would be printed notwithstanding that there may be zero digits which are not arithmetically significant, that the sign may be positive and discardable, or that there may not be an overflow. For these conditions, it would be preferable to edit the presentation. Consequently, provision heretofore was made for printing a space where it would be more appropriate than these symbols and for other editing operations, such as inserting decimal points, separating decimal digits, or for printing less than all of the numerals set up in the word, by programming the computer. The resultant increased complexity of the program as heretofore employed in digital computers which, for instance, necessitated frequent changes in mode of operation between numeric and alphabetic, involved delays often exceeding the time required for presentation of non-edited data.

It is thus an object of the present invention to provide a system for reading out the digits of a computer word to a typewriter, interspersed with selected editing characters and controlled by selected editing operations.

It is a further object of the invention to accomplish these editing functions with a single computer command.

It is also an object of the invention to provide a system for reading out the digits of, for example, a computational result stored in the computer memory, in a form appropriate for presentation on business forms of various types, particularly checks, bills, and accounting ledger sheets.

A further object of the invention is to provide an editing system which does not increase the time required to present data, nor excessively complicate the program.

Other objects and many of the attendant advantages of this invention will become readily apparent as the same becomes better understood by reference to the preferred embodiments detailed in the following description and the accompanying drawings wherein:

Fig. 2 shows the code pattern employed during a word period to represent a command.

Fig. 3 shows the code pattern employed during a word period to represent a number.

Fig. 4 shows the locations in a word period of the key symbols defining the editing instructions.

Fig. 5 is a table indicating the coded information used for representing the sign and overflow conditions of a number.

Fig. 6 is a table listing the significance of each key symbol presented in Fig. 4.

Fig. 7 is a table showing the characters capable of being printed by the typewriter during the decimal readout routine and the codes corresponding thereto as set up in flip-flops A1 to A6.

Fig. 13 shows the portion of the computer flow diagram which accomplishes the editing and printing subroutine.

Fig. 14 is a table listing the recirculating registers and flip-flops employed by the computer in the invention, with their corresponding function.

Fig. 16 is an example of a read-out command set up in the H register.

Figs. 17 and 18 are examples of words to be read out as set up in the E register.

Fig. 19 is an example of an editing code set up in the F register.

Fig. 20 shows an example of how the words of Figs. 17 and 18 are presented by the typewriter if no editing were done.

Fig. 21 shows an example of how the words of Figs. 17 and 18 are presented by the typewriter with editing done in accordance with the invention.

Figure 1:
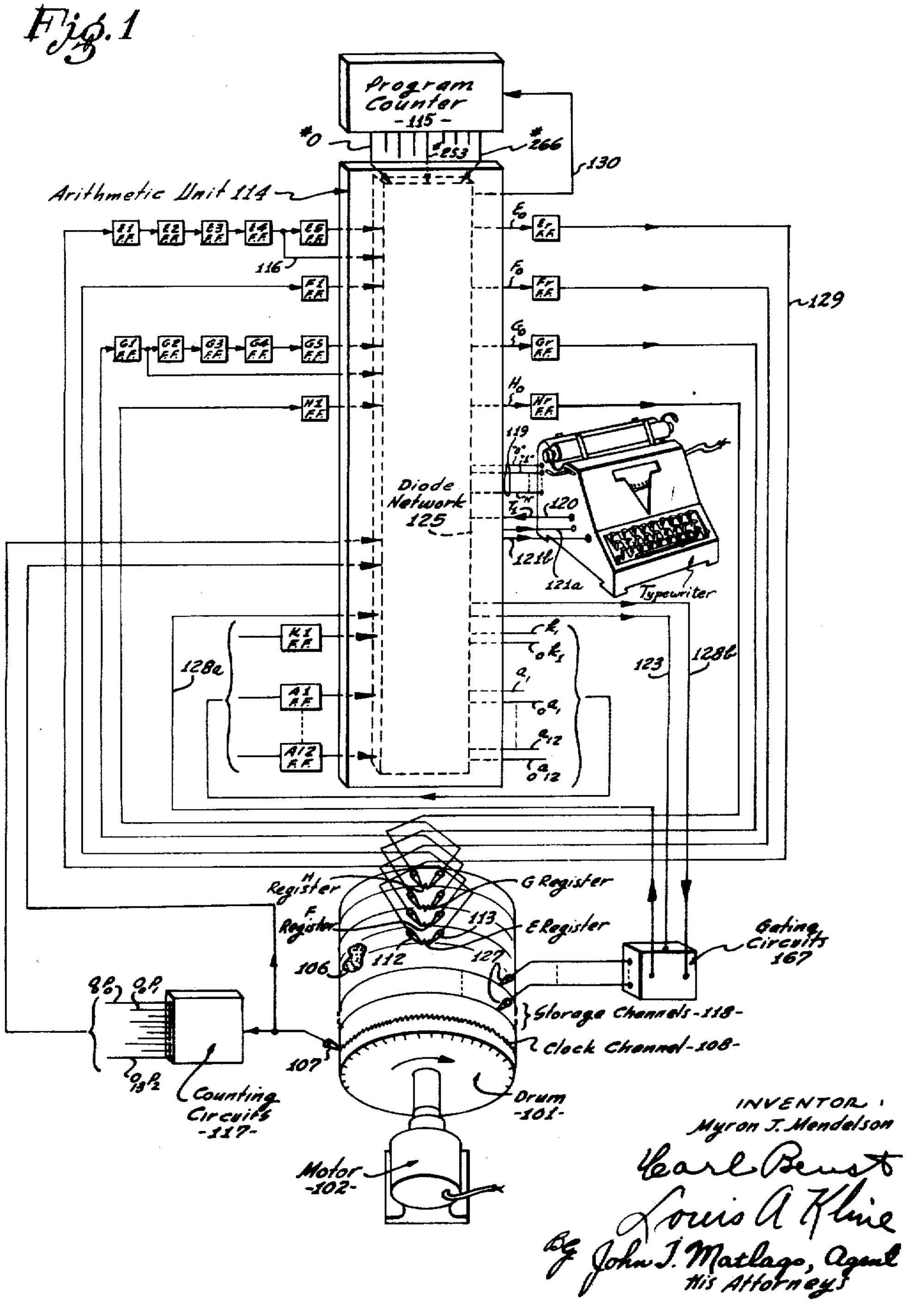
Fig. 1 is a perspective view illustrating the cooperative relationship of relevant portions of the system exemplifying the present invention.

The invention is herein disclosed with reference to a general purpose computer operatively connected to an electric typewriter, the latter being employed as input-output equipment. Specifically, the invention is concerned with a computer routine which utilizes the typewriter and is commonly known as read-out. Thus, this specification and the accompanying drawings will describe and illustrate in detail only such portions of the computer, its read-out routine and the typewriter, as are required to explain the principle and operation of the invention, or require modification to provide therefor.

The overall communications system of concern here performs broadly the following operations in accordance with a program inserted into the computer by the operator: (1) identifies a command which causes the computer to control the typewriter to print, in sequence, each word of a group of words stored in the computer memory, and (2) employs an editing and printing subroutine to intersperse, among the digits of a word being read out, specified editing instructions. The preferred editing instructions are for control of the typewriter and comprise the following: (1) effect spacing instead of printing succeeding zeros, (2) print a decimal point, (3) tabulate, and (4) stop printing for this word.

Briefly, the editing and printing subroutine herein contemplated employs three synchronized one-word recirculating registers of the computer. One register is set up with the digits of a word stored in the memory; this word represents a number. A marker is inserted in a second register to identify the location of the sign and overflow indications characterizing the number set up in the first register, which indications, considered timewise in the present embodiment, appear last in the register. A third register is set up with an editing code by the programmer to select the above-mentioned editing instructions, such that digits read out will be presented by the typewriter in the form most appropriate to the application under consideration (i. e., for best presentation on a check, ledger sheet, etc.).

During a first sequence through the editing and printing subroutine, if the number set up in the first register carries an overflow indication and is positive in sign, a set of flip-flops are arranged in accordance with a code representing the letter "P," the outputs of these flip-flops are transmitted to the typewriter where they are detected and the key for this letter is activated to print; but if the sign of the number is negative, the above arrangement causes the typewriter to print the letter "N." If the number does not carry an overflow and is positive, the typewriter is caused to space; but if it is negative, the typewriter prints a minus sign (—).

During subsequent sequences through the editing and printing subroutine, the decimal digits comprising the magnitude portion of the number, interspersed with the aforementioned preselected editing instructions, are transmitted, in coded form, one at a time, to the typewriter as printing instructions. With regard to the sensing of the digits in the first register, transmission is made for the most significant (i. e., latest timewise) digit first and the least significant (i. e., earliest timewise) digit last.

The digit or editing instruction presently to be printed is identified by the second register, in which the marker is moved to an earlier timewise position of the register so as to identify the most significant decimal digit of the word in the first register not yet printed and also to identify the editing instructions in the third register intended to affect the presentation of this digit to the typewriter. Thus, for example, in the case for which all digits to be read out are to be presented in one group, if no editing is called for by the third register, the most significant digit in the first register is printed. If the editing called for suppression of zeros not arithmetically significant, the typewriter spaces a number of times corresponding to such zeros instead of printing. If the editing called for is a decimal point, this is printed first and then the digit is printed. If the editing called for is a tabulation, this operation is performed prior to printing the digit. If the editing indicates that printing is to be stopped after the printing of a digit not the last in the word (i. e., that only some digits of the number are to be read out), the computer leaves the editing and printing subroutine, and performs a test to determine whether or not other words are to be read out. A successful result causes each word to be set up for read-out individually and the editing and printing subroutine to be performed as for the first word. An unsuccessful result causes the next command in the program to be identified and executed. If a word comprises a number with digits to the limit of the capacity of the word, and if the editing does not indicate that less than all the digits of the number are to be read out, printing of the digits continues until the least significant digit is printed, at which time the computer leaves the editing and printing subroutine to perform the test for other words to be read out.

Figure 12:
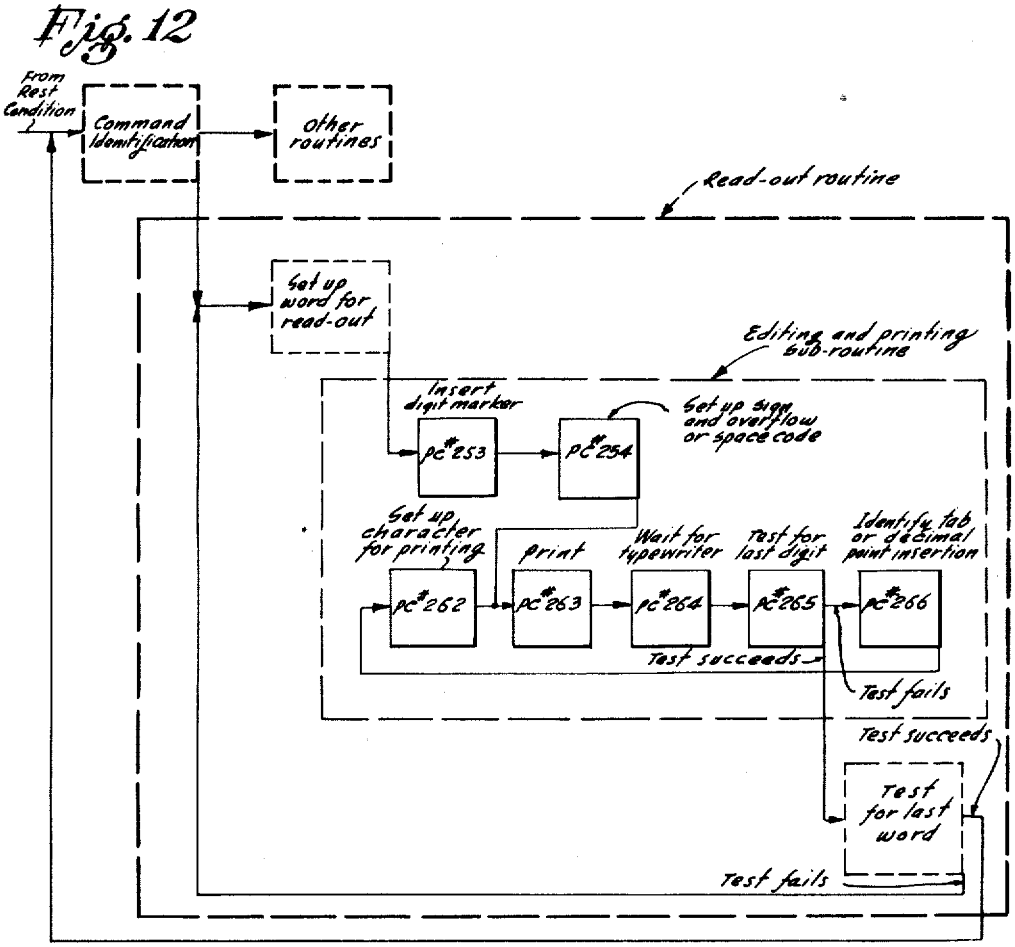
Fig. 12 is an extract of the computer flow diagram showing the overall system of which the present invention is a part.

A presentation of further details of this system will be given later in connection with a discussion of Figs. 12 and 13.

Referring first to Fig. 1, a perspective view is shown of a computer with provision for the preferred embodiment of the invention.

Here is shown memory drum 101 having a magnetizable surface 106. Drum 101 is rotated, in a clockwise direction, by motor 102. Adjoining surface 106 and stationarily positioned so as to be capable of recording thereon information in the form of binary magnetic patterns or receiving information in the form of voltages induced by such patterns as are already established, are magnetic sensing elements, such as head 107, which, as drum 101 revolves, define circumferential channels thereupon.

Clock channel 108 completely circumscribes drum 101 and contains a permanently recorded magnetic flux pattern representing an electrical sine wave so as to form a timing signal track, the sine wave cycles of which divide the drum circumference into 2688 elemental areas in the preferred computer. Head 107 senses the changes in magnetic flux pattern on clock channel 108, thereby generating an electrical signal indicative of each sine wave cycle. The electrical signal is shaped to a symmetrical square waveform preliminary to causing it to serve as driving voltage for other components. Such circuitry (not shown) is well known in the art, and generally comprises several stages of amplification, a pulse shaping circuit, a triggering circuit of the Schmitt type and a diode clamping arrangement. The resulting square wave, hereinafter designated as signal C, has a period equal to that of the original sine wave and an amplitude clamped between +100 v. D. C. and +125 v. D. C. The time period between trailing edges of signal C will be designated as a clock period, and a differentiated signal generated by the abrupt fall of the trailing edge of signal C is employed to trigger the logical circuitry in the computer. It may be noted that signal C is also used to synchronize logical networks of arithmetic unit 114 and it should be understood that all logical propositions in the computer operate at the same two voltage levels as signal C, i. e., +100 v. D. C. and +125 v. D. C.

It is by utilizing signal C as a reference during reading and recording that the other circumferential channels of drum 101 are divided into a similar number of elemental memory areas. Each of these memory areas in the other channels shown in Fig. 1 is capable of containing a digit of binary information, i. e., a saturated flux pattern either in one direction or the other. When the flux is in one direction in a given elemental memory area, a binary digit "one" is represented; when it is in the other direction, a binary digit "zero" is represented.

Computer components are designed to serially handle information in groups consisting of a fixed number of binary digits. These groups may represent either commands or numbers and are commonly referred to as "words." A word is comprised of a sequence of 42 consecutive binary digits. The portion or arc of a circumferential channel in which a word may be recorded is designated a storage register. Since clock channel 108 contains 2688 sine wave cycles, storage space or registers for 64 words (2688/42) are provided on each of the channels. Thus the circumference of drum 101 is divided into 64 arcuate registers as shown on the end of drum 101, the arcs being consecutive such that the defined registers extend over the entire circumference of the drum. The time required for one arc to pass a head is designated as one word period, which is defined by 42 cycles of the sine wave passing head 107 of clock channel 108.

Counting circuits 117 are provided for counting the clock pulses generated by head 107 and its associated circuitry. This counter responds to a cycle of 42 clock pulses. Thus the overall counting cycle defines the period allotted to a register on the drum. Counting circuits 117 respond directly to the signals induced in head 107 and have an output corresponding to each of three successive clock pulse counts, namely, $P_0$, $P_1$, and $P_2$, and an output corresponding to each set of three clock pulse counts, namely $O_0$, $O_1$, . . . $O_{13}$. Thus, since the "P" counts are considered as binary counts, the "O" counts may be thought of as defining octal digits. This arrangement thereby divides each register into 14 octal digits and each octal digit into three binary digits. Accordingly, by noting the P and O counts together, succeeding elemental memory areas on the arc, hereinafter to be designated "binary digit positions" or "pulse positions," are identified as $O_0P_0$, $O_0P_1$, $O_0P_2$, $O_1P_0$, . . . $O_{13}P_2$. In summary, each word period is divided by this arrangement into fourteen O (octal) periods, each of which is subdivided into three P (binary) positions and in each of the latter may be stored one binary digit. Thus, by noting the outputs of counting circuits 117, the pulse position in an arc, or storage register, presently being scanned by the heads on drum 101 can be observed.

The configuration of computer words will next be discussed as preliminary to a description of the other channels of drum 101.

Referring to Fig. 2, a diagram showing the serial arrangement in a word period of information will be described. The word period of 42 clock periods is shown to be divided into 14 equal octal digit periods, $O_4$ through $O_{13}$, respectively. Each of these octal periods is further divided into three binary digit positions marked $P_0$, $P_1$, and $P_2$.

In Fig. 2, the specific word arrangement shown is the representation of a command capable of execution by the computer. The information in a command is defined by the notation (I, $m_1$, $m_2$, $m_3$). With respect to the present invention, I is a code employed in sequencing the computer to execute a routine which reads out decimally information stored in the memory to an electric typewriter such as referenced above; portions $m_1$ and $m_2$ contain memory addresses; and portion $m_3$ contains a numeral representing the number of words to be read out.

Fig. 3 shows the serial arrangement in a word period of information representing a number. It can be seen that the computer provides for operating on decimal numbers nine digits in length (36 binary numbers), accompanied by codes representing the sign of the number and whether or not the number is accompanied by an overflow condition.

Returning now to Fig. 1, next in order on drum 101 are storage channels 118, each of which is equipped with a head 127, used for both reading and recording. Communication of information between heads 127 and arithmetic unit 114 is controlled by gating circuits 167, which receives a selective signal on line 123 from arithmetic unit 114 to permit only one storage channel to communicate with arithmetic unit 114 at a time via lines 128a and 128b.

Referring to the recirculating registers E, F, G, and H, it is noted that each of these recirculating registers has two heads associated with the drum memory, one for reading and the other for recording, arranged such that as drum 101 rotates, a portion of the drum surface will pass the record head first and the read head later. For example, the E register includes record head 112 spaced along the drum surface from read head 113. Thus, as far as the recirculating registers are concerned, only a small arcuate portion of the drum surface is used for storing information at a given time. This portion occupies an area equivalent to less than 42 elemental memory areas, and the information is delayed in arithmetic unit 114, regardless of whether or not it is modified, a given number of clock periods so that the normal recirculating time for each of these registers is one word period. The recirculating registers have their heads interconnected by way of arithmetic unit 114 so that, for example, when the computer circuitry is set for recirculation in a register, a particular binary digit signal on being recorded on the drum surface by the record head will be carried by drum 101 to the read head, sensed thereby, transmitted to arithmetic unit 114 wherein the signal steps through flip-flop circuits, and is then retransmitted to the record head by which it is again recorded. Thus, it is noted that information recirculating in these registers is stored dynamically in that the moving arc serves as a medium for temporarily delaying information recorded thereon so that it can be picked up a fixed period later.

It should be understood that the circuitry in control of the recirculating registers is well understood. Briefly, for the E register, for instance, the output of diode network 125 of arithmetic unit 114, designated as proposition $E_0$, is a square wave clamped between +100 v. D. C. and +125 v. D. C., and is fed to the gating circuit of one grid of flip-flop E*r*. Proposition $E_0$ is also inverted and fed as proposition $E_0'$ (not shown) to the gating circuit of the other grid of flip-flop E*r*. Both grid gates are synchronized by signal C and the outputs, $E_r$ and $E_r'$, of flip-flop E*r*, represented by line 129, are employed to energize record head 112. Information picked up from drum 101 by read head 113 is fed through a chain of flip-flops E1 to E5, such that the binary values represented by the consecutive conduction states of a flip-flop in the chain are successively transferred into the next flip-flop of the chain at every fall of signal C. These flip-flops serve to give the recirculating register a degree of flexibility in that information can also be routed directly from them into diode network 125. An example of such a connection is provided by line 116 which routes the outputs of flip-flop E4, namely, $E_4$ and $E_4'$, into diode network 125. Thus, information in flip-flop E4 is presented to diode network 125 one clock period earlier than it is presented by flip-flop E5.

Flip-flops A1 to A6 function to store the code for a character to be printed by the typewriter. The outputs of these flip-flops are fed to the typewriter on line 119.

Flip-flops A7, A8, and A9 operate as means to step a marker set up in a binary digit position of the G register such that the decimal digit to be presently printed is identified.

Flip-flops A10, A11, and A12 operate to cause flip-flops A1 to A6 to be set up with the code for typewriter spacing, printing a decimal point, and tabulating, respectively.

Fig. 1 also indicates that information is received by diode network 125 in the form of a signal $T_1$ on line 120. Signal $T_1$, it will be shown, is generated in the typewriter from voltages supplied via lines **121*a* and 121*b*** by the computer, and serves to indicate that the typewriter is ready to receive signals representing a character to be printed.

In the present computer, the processes performed are divided into sequential operations, each requiring a time period of one word length. It is the function of program counter 115 to render certain networks operable during each word period so as to accomplish each of these step operations. Accordingly, each output count signal #0, #1, etc. of program counter 115 renders operable certain circuits of diode network 125 which respond to its input during each of the 42 clock periods of a word to generate the desired output propositions.

The content of program counter 115 is subject to being changed precisely at the end of each word period, as directed by the state of flip-flop K1 during the last binary digit position of each word period ($O_{13}P_2$), to cause other circuits to become operable during the next word period. Thus Fig. 1 shows that program counter 115 feeds its outputs into diode network 125 and is in turn controlled by output 130 (from flip-flop K1) from diode network 125. Reference to Fig. 13 will clarify the action of program counter 115. This figure presents the portion of the computer flow diagram relevant to editing and printing and shows how the step operations are arranged in sequence to accomplish this sub-routine when the coded command "print decimally on typewriter," programmed into the computer by the operator, is being executed. As noted in Fig. 13, each of the step operations is represented in the flow diagram by a block identified by a number, such as PC#253, corresponding to an output of program counter 115. Each such block represents diagrammatically a set of logical operations to be performed serially by diode network 125 on information passing through arithmetic unit 114 during a single word period. The flow diagram extract shows the sequence in which program counter 115 changes in content, thus automatically directing the order in which the one-word step operations are performed by the computer. Generally, program counter 115 increases in content or "counts" (octally in this computer) in an orderly fashion as the one-word operations are sequenced from left to right on the flow diagram; an example is horizontal output 129 from PC#253 to PC#254 in Fig. 13. However, program counter 115 may have the same number content for more than one word period, i. e., program counter 115 may "stick" in a given number as indicated, for instance, by a vertical output such as represented by line 131 associcated with PC#264. Furthermore, program counter 115 may "skip" from one PC# to another, as indicated, for example, when it skips from PC#254 to PC#263 via the vertical output represented by line 132.

It is the state of flip-flop K1 at the $O_{13}P_2$ position of a word period, that determines which of the two courses (horizontal or vertical) program counter 115 will follow when computer clock pulse C falls at the end of pulse position $O_{13}P_2$. In the present computer, if flip-flop K1 is false at $O_{13}P_2$, program counter 115 will count; if flip-flop K1 is true at $O_{13}P_2$, program counter 115 will stick or skip. The state of flip-flop K1 at $O_{13}P_2$ is the result of a number of conditional processes, one of which occurs during every word period and which wlil be presented for each word period.

Before considering further features of the computer circuitry concerned with the present invention, the preferred type of flip-flop and nomenclature will be broadly outlined.

Figure 8:
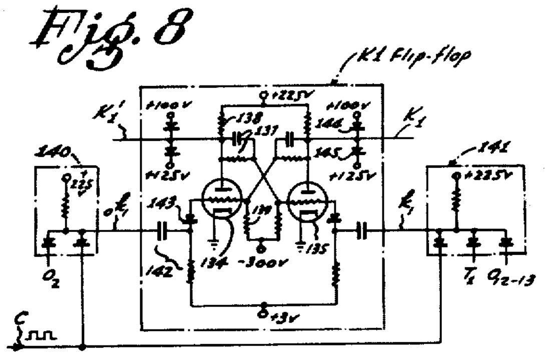
Fig. 8 is a schematic diagram of flip-flop K1.
Figure 9:
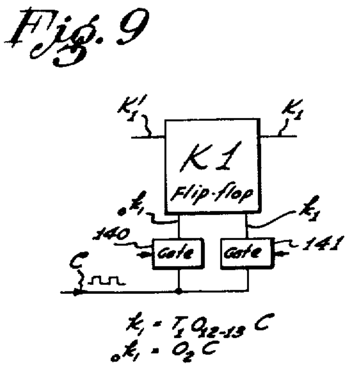
Fig. 9 is a block diagram of flip-flop K1 together with the logical equations defining its operation during PC#263.

Logical propositions may be considered to be represented in circuitry by the states assumed by flip-flop circuits having two input lines and two output lines, as illustrated by the arrangements of Figs. 8 and 9. This circuit, designated as flip-flop K1, utilizes a pair of triode tubes, such as tube 134 and tube 135, the conduction in which is controlled by gating circuits, such as 140 and 141, respectively. When the flip-flop is in the condition such that tube 135 is cut off and tube 134 is conducting, output $K_1$ from tube 135 is clamped at +125 v. D. C., output $K_1'$ from tube 134 is clamped at +100 v. D. C., and the flip-flop is said to be true, i. e., storing a binary "1." When the flip-flop is in its other condition wherein tube 135 is conducting and tube 134 is cut off, output $K_1'$ is high in voltage, output $K_1$ is low and the flip-flop is said to be false, i. e., storing a binary "0." In order to trigger the flip-flop, signals in the form of negative-going pulses, the source of which is signal C, are applied on separate input lines coupled to the grids of the flip-flop tubes in accordance with the convention that input $k_1$ must be at +125 v. D. C. in order to pulse tube 135 and make output $K_1$ high, and that input $_0k_1$ must be at +125 v. D. C. in order to pulse tube 134 and make output $K_1'$ high.

Describing the circuit of flip-flop K1 of Figs. 8 and 9 in greater detail, as shown, triodes 134 and 135 are arranged such that the plate of each is intercoupled to the grid of the other by a resistor-capacitor combination, such as 137. Each plate is provided with a load resistor, such as 138, prior to connection to +125 v. D. C.; each grid is provided with a resistor, such as 139, prior to connection to −300 v. D. C. bias; and each cathode is grounded. The inputs to the grids of triodes 134 and 135 are from gating circuits 140 and 141, respectively, during, for instance, PC#253 of Fig. 13. The gating circuit outputs are differentiated and clipped by networks, such as 142, and diodes, such as 143, so that negative pulses only are applied to the grids of the triodes. The output from each triode is from the plate and is clamped between +100 v. D. C. and +125 v. D. C. by diodes, such as 144 and 145.

If, for example, the flip-flop is storing a binary "0," a negative pulse applied to the grid of triode 135 will cut it off, thereby causing the output $K_1$ to be high. This pulse is provided by an output from gate 141 (i. e., all of the input signals representative of terms $T_1$, $O_{12-13}$, and C simultaneously at the high potential of +125 v. D. C.). At the end of the pulse period, the clock pulse will abruptly drop to the potential +100 v. D. C., which change, after differentiation, will produce the requisite negative-going trigger. It follows that flip-flop K1 will enter period $O_0$ of the next word period in a true state. It should be noted that, if flip-flop K1 were already true during $O_{12-13}$, triode 135 would already be cut off and the negative pulse supplied by gate 141 would have no effect. In this case, the only way to change the state of flip-flop K1 would be to pulse the grid of triode 134 by providing an output from gate 140.

For the presentation of other flip-flop circuits, resort will be made to block diagrams to represent the schematic form, as illustrated by Fig. 9 for flip-flop K1, and the Boolean equations and diode networks which define when and how the flip-flop circuit is to change will be shown below the block diagram.

Figure 10:
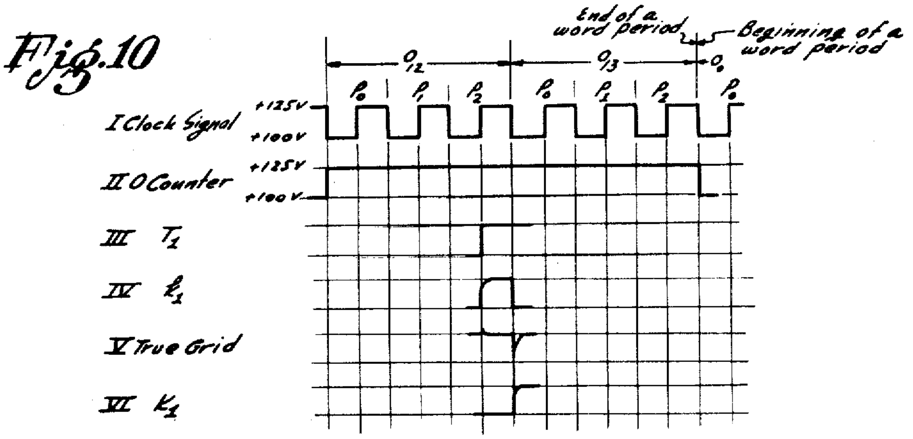
Fig. 10 is a graph of the waveforms concerned with the $k_1$ triggering equation during PC#263.

The action of flip-flop K1 in accordance with the equation shown will be further explained by the waveforms of Fig. 10. These graphs show how flip-flop K1 is triggered true from a prior false condition during period $O_{12}$ as the result of the equation $k_1 = T_1 O_{12-13} C$ (Fig. 8). Line I represents signal C. Line II shows the output of counting circuits 117, which defines the period $O_{12-13}$ during which diode network 125 is arranged by program counter 115 to make flip-flop K1 responsive to clock signal trigger pulses which will take effect provided a signal $T_1$, received from the typewriter, is high. In line III this provision is shown to be met at $O_{12}P_2$. It is thus at $O_{12}P_2$ only that an effective true input $k_1$ (line IV) will be generated. However, flip-flop K1 will be triggered true only by a negative-going pulse applied to its true grid. This pulse occurs, as shown in line V, when the $k_1$ input sharply drops to a low potential at the end of $O_{12}P_2$ due to the fall of the clock pulse. Thus, as line VI shows, the output $K_1$ swings to a high potential at $O_{13}P_0$. It is noted that flip-flop K1 will remain in the true state until triggered in accordance with the $_0k_1$ equation of Fig. 8.

Figure 11:
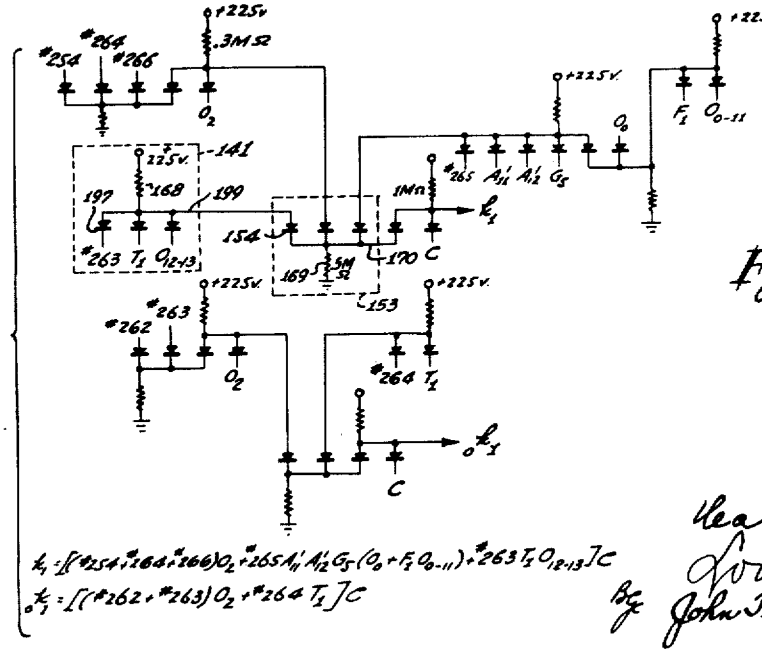
Fig. 11 shows the diode networks and triggering equations for flip-flop K1.

Logical product and sum networks (gates and mixers, respectively) are illustrated in Fig. 11, which shows, for the editing and printing subroutine, the complete triggering equations, block diagram, and circuitry for flip-flop K1. Thus, for example, the equation effective during PC#265:

$$k_1 = A_{11}'A_{12}'G_5(O_0 + F_1O_{0-11})C$$

is interpreted as meaning that flip-flop K1 will be triggered into the true state at the end of the clock period during which the terms $(A_{11}'A_{12}'G_5)$ and $(O_0+F_1O_{0-11})$ are at a high potential (logical multiplication), where $(O_0+F_1O_{0-11})$ itself will be at a high potential whenever the term $O_0$, or the term $(F_1O_{0-11})$ is of a high potential (logical addition).

Thus, in Fig. 11, the portion of the diode network enclosed within block 141 is a typical gate network. In such a circuit, signals having voltage levels of either +100 v. or +125 v. are obtained from the sources indicated and applied on the cathode-ends of crystal diodes, such as 197, whose anode-ends are joined to common line 199 connected to positive source +225 v. through product resistor 168.

Any time all the diode input signals to gate 146 are at the high potential of +125 v., the output of line 199 swings to this high potential. If any one of the input signals is at the low potential of +100 v., the output on line 199 is at this low potential.

Output line 199 is connected as one of the inputs of a typical mixer network, enclosed within block 153. Mixer 153 is comprised of input diodes, such as 154, whose cathode-ends are joined to common line 170 and returned to ground through sum resistor 169. The input signals to this circuit are applied on the anode-ends of the diodes. Whenever any one of the inputs to mixer 153 is at the high potential of +125 v., the output on line 170 is at this high potential.

It is also evident that output line 170 is connected as an input to a further gate network, and the output of the latter is the term $k_1$, which, as mentioned, drives a grid of flip-flop K1.

More particular reference will next be made to Fig. 13 showing an extract of the computer flow diagram relevant to the editing operation of the present invention, intended as adjunct to the read-out routine of the computer shown in Fig. 12.

The information found in the H register during the read-out routine is comprised of the four sections I, $m_1$, $m_2$, and $m_3$, as shown in Fig. 2. Section I contains the code characterizing the instruction "read out decimally on the typewriter"; section $m_1$ contains the memory address of the first word to be read out; section $m_2$ contains the memory address of a storage register which is storing the editing code; and section $m_3$ contains a number whose magnitude represents the difference between the first and last memory register addresses which are to be read out in numerical order during the execution of the command (i. e., the total number of memory registers to be read out with this command).

For the discussion of Fig. 13 that follows, it is expedient to assume that the recirculating registers of the computer are already storing initial operating data obtained from recordings placed in various of the storage registers of the memory, said transfer having been accomplished by prior routines performed by virtue of the instruction in the command of Fig. 2. Thus, referring momentarily to Fig. 12, which shows the overall communications system of concern here, it is seen that the editing and printing subroutine is embodied as a feature of a more general read-out routine capable of performance by the computer. This read-out is executed after identification in a routine labeled "command identification," from the instruction I contained in the H register. Execution commences with the subroutine labeled "set up word for read out" which functions to cause a look-up in the memory for the address specified in the $m_1$ portion of the H register (Fig. 2) and transfers the word therein (the first word to be printed) to the E register; examples are shown in Figs. 17 and 18. Further, this subroutine also functions to cause a look-up for the memory address specified in the $m_2$ portion of the H register and transfers the word therein (the editing code) to the F register; an example is shown in Fig. 19. Additionally, it is to be noted that this subroutine causes all flip-flops, with the exception of flip-flops A1 to A6 and A10, to be set false.

In the present computer, provision is made for utilizing associated output devices such as an automatic typewriter, tape recorders, etc. Additionally, information is supplied to one of the devices at a time in several different forms (decimally, octally, etc.), one form at a time, in spite of the fact that the computer actually operates on binary numbers. The output devices and form to be used are preselected during the "set up word for read out" routine, which is prior to the commencement of the editing operation. The preferred preselection illustrated herein functions to operate a typewriter and causes the computer to present the typewriter with groups of signals corresponding to decimal information, i. e., each group represents a character indicated on the keyboard of the typewriter. It is to be noted that the characters capable of being printed by the typewriter include the letters of the alphabet, the decimal digits and other symbols, also generally capable of being printed by a typewriter, such as "space," "decimal point," "tabulation," etc.

Fig. 13, which will now be explained in detail, shows how the digits of a word recirculating in the E register of the computer, interspersed by editing symbols, are transferred to an electric typewriter for printing. Within the rectangle representing each word time block of Fig. 13 there appear concise statements describing the activity during that word period. This activity is precisely defined by the logical equations shown below each block.

The word to be presently read out is stored in the E register and is read out in portions consisting of four sequential binary digits, i. e., a decimal digit at a time. The decimal digit presently being read out is identified by a marker pulse in a binary digit position of the G register corresponding to the position of the decimal digit in the E register. After typing a character representing a decimal digit set up in the E register, the marker in the G register is shifted so that the next significant decimal digit in the E register will be read out.

The editing code is stored in the F register and is effective continuously during a word period to alter the presentation of decimal digits to the typewriter by suppressing digits which it is desired not to print, by interspersing with the digits codes which cause the typewriter to print a decimal point or effectuate a tabulation operation and by coding the computer to cease transmitting digits to the typewriter after a specified number of digits have been read out.

Thus, in effect, information presented to the typewriter originates at two basic sources: one, the E register word, and the other, the F register editing code.

Figure 15:
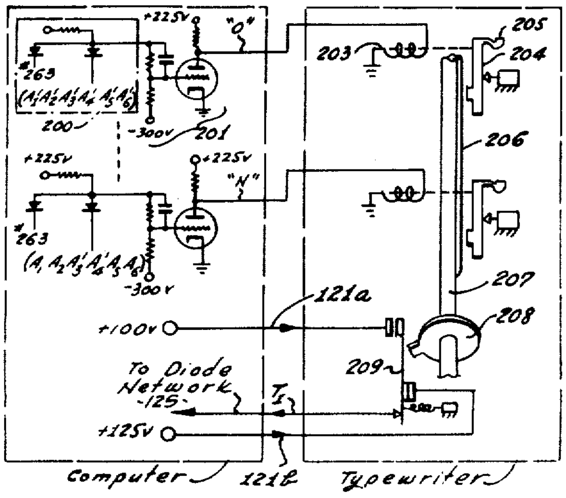
Fig. 15 shows the tie-in between the computer and the typewriter relevant to the read-out routine.

As a result of identifying a character to be printed, flip-flops A1–A6 are set up with the typewriter code for this character (Fig. 7). The network shown in Fig. 15 is made operative during PC#264, causing the proper one of the print relays on the typewriter to be actuated.

As stated, the marker in the G register is shifted toward the right (earlier timewise) to identify the succeeding decimal digit in the E register to be read out. Since the F register editing code intended to affect the presentation of an E register digit is set up in binary digit positions coincident with the digit, the G register marker pulse also identifies a digit's corresponding editing code. When the marker pulse has been shifted right into the $O_0$ period of the G register, i. e., when all the digits of a word have been read out of the E register, or when the marker pulse coincides with the editing code in the F register which indicates that a digit is the last to be printed out, PC#265 functions to direct the computer out of the routine.

If other computer words remain to be read out, that is, if the number in the $m_3$ portion of the H register is other than zero, the computer is sequenced to the portion of the read-out routine which adds a unit to the address in portion $m_1$ of the H register and subtracts a unit from the number in portion $m_3$ of the H register, looks up the address now specified in portion $m_1$ of the H register, and sets up the E register to correspond with the contents thereof. This word is then edited by means of the invention and read out. When the number in portion $m_3$ of the H register is reduced to zero, all read-out routines are complete and the computer sequenced to a routine which executes the next command in its program.

Referring to the editing and printing subroutine shown in the flow chart of Fig. 13, it should be apparent from the discussion of Fig. 1 that one of the functions of PC#253 is to recirculate the word to be read out ($E_0=E_5$), the editing code ($F_0=F_1$), and the read-out command ($H_0=H_1$) so as to make this information continuously available during the word period. It will be noted when other word time blocks of Fig. 13 are considered, to expedite the discussion, that reference to normal recirculation of these registers is omitted. A second function of PC#253 is to provide for the insertion of a marker "one" in position $O_{12}P_0$ of the G register by means of the equation $G_0=O_{12}P_0$. Reference to Fig. 3 will indicate that position $O_{12}P_0$ of the E register contains the least significant binary digit of the information characterizing the number to be read out. Thus, the marker in the G register serves to identify the location of this information in the E register. As stated, flip-flop K1 enters PC#253 in the false state. Since flip-flop K1 is not triggered during PC#253, it is false at $O_{13}P_2$ of the word period, thereby causing a count to PC#254.

The main function of PC#254 is to set up flip-flops A1 to A6 with a code representing the number information. The four codes employed by the present computer are shown in Fig. 5. In brief, it may be noted that for position $O_{12}P_0$, a "one" indicates that an overflow has been generated as a result of the previous calculations while a "zero" indicates that no overflow is present. Also, for position $O_{12}P_1$, a "one" indicates that the number is negative while a "zero" indicates that the number is positive.

It has been pointed out that the code for a character to be printed by the typewriter is set up in flip-flops A1 to A6. These flip-flops enter PC#254 in the true state and are triggered false if the code (Fig. 7) corresponding to the information characterizing the number (Fig. 5) so requires.

The triggering equations for the grids of flip-flops A1 to A6 contain the term $G_5$, indicating that triggering can take place only at the end of the pulse position characterized by the marker in the G register, namely, $O_{12}P_0$. It follows that, if a flip-flop of this group is not triggered false at $O_{12}P_0$, it will leave PC#254 in the true state.

Thus, if the number to be read out, as set up in the E register, is positive and carries no overflow, flip-flops A2 and A6 are triggered false by the respective equations ${}_0a_2=E_4'G_5C$ and ${}_0a_6=E_4'E_5'G_5C$, while flip-flops A1, A3, A4, and A5 remain true. Reference to Fig. 7 will indicate that the resultant configuration of flip-flops A1 to A6 corresponds to the typewriter operation (space). The typewriter therefore spaces whenever a number to be read out is positive and carries no overflow.

The codes in flip-flops A1 to A6 may be similarly derived for the remaining cases of Fig. 5. It is to be noted that a positive number with an overflow condition requires that the letter "P" be printed, that a negative number with an overflow condition requires that the letter "N" be printed, and that a negative number with no overflow requires that a minus sign "—" be printed.

Finally, in PC#254, flip-flop K1 is set true by means of the equation $k_1=O_2C$, thereby providing for a program counter skip to PC#263.

It is in PC#263 that the character set up in flip-flops A1 to A6 during PC#254 is printed by the typewriter. Because the mechanical operation of the typewriter is slow relative to the electronic operation of the computer, to provide a delay required to permit the typewriter to receive the four binary digits, set them up in its storage relays and actuate the corresponding key, the computer sticks in PC#263 until a signal $T_1$ is no longer received from the typewriter. The receipt of signal $T_1$ indicates that the typewriter is ready for the next four binary digits, at which time the computer sequences out of the word block.

During the command identification routine, executed prior to entering the read-out routine, upon detection of a code indicating that the read-out device to be employed is the typewriter, the computer had provided an energizing signal for the typewriter. Activation of the typewriter in turn permits the transmission of a continuous signal $T_1$, at the computer effective potential +125 v., from the typewriter to the computer. This signal $T_1$ is at the +125 v. level only when the typewriter character relays are available to receive information set up in flip-flops A1 to A6, otherwise signal $T_1$ is at the ineffective potential of +100 v.

Reference to Fig. 15 will clarify how information set up in flip-flops A1 to A6 is read out to the typewriter.

Here are shown a plurality of gating circuits, such as gate 200. One of the two inputs to each gate is the output PC#263 of program counter 115. The other input comprises the outputs of flip-flops A1 to A6 in accordance with the code of Fig. 7. The output of gate 200 is amplified in driver stage 201, the plate current of which, when the output gate 200 is high, energizes the coil of character relay 203, in the typewriter. The armature of character relay 203 comprises seeker 204, carrying key 205, which, when the coil of relay 203 is energized, becomes positioned adjacent to bail 206 on translator shaft 207. The arrangement for other characters which the typewriter is capable of printing is similar. Shaft 207 makes one revolution for each character to be printed. Mounted on shaft 207 is cam 208 which operates switch 209 to transmit signal $T_1$ at the high voltage level of +125 v. to the computer at all times except when a character is being printed. Thus, when signal $T_1$ is at the high voltage, it is an indication that the typewriter is available to receive information from the computer.

Consequently the equation $k_1=T_1O_{12\text{-}13}C$ and ${}_0k_1=O_2C$ (word block PC#263) indicate that, although flip-flop K1 is set during period $O_2$ of each word period to cause a program counter count to PC#264, it will be reset during period $O_{12\text{-}13}$ of each word period as long as signal $T_1$ remains high, thus causing program counter 115 to stick in PC#263. It follows that at the end of the first word period that signal $T_1$ is low, the computer will enter PC#264.

In a similar manner the triggering equations for flip-flop K1 effective during PC#264 operate to cause sticking in this word time block until signal $T_1$ again becomes high, thereby informing the computer that the typewriter has completed the printing of a character and is ready for the next.

Thus, when PC#265 is entered, the printing of one character has been completed. In this word time block several functions are accomplished.

Firstly, if the character last printed was decimal point or (tab), as indicated by a true state of either flip-flop A11 or A12, respectively, as will be shown, the G register is recirculated in accordance with the equation $$G_0=G_5(A_{11}+A_{12})O_{0\text{-}11}$$

and thus the position of the marker therein is not changed. This is because the digit in the E register identified by the marker has not yet been printed. However, if a digit originating in the E register has just been printed, the marker in the G register is shifted four binary digit positions to the right to identify the next digit of the E register. This shift is made by causing proposition $G_0$ to follow the state of flip-flop G1, i. e., $$G_0=G_1A_{11}'A_{12}'O_{0\text{-}11}$$

as explained in connection with Fig. 1. It is noted that the $G_0$ equation is here effective during periods $O_{0\text{-}11}$, which, as presented in connection with Fig. 3, are those which may contain the digits of a number.

The triggering equations for flip-flops A1 to A6 reset these flip-flops false preparatory to being set up for the next character to be printed.

In PC#265 a test is conducted to determine whether or not all printing in connection with the word in the E register has been done. If the test is successful, the computer skips to operations which read out subsequent words, if necessary (Fig. 12). If, however, the test fails (additional characters are to be printed), a count to PC#266 is made.

The test resides in the control of flip-flop K1 by the equation $k_1=A_{11}'A_{12}'G_5(O_0+F_1O_{0\text{-}11})C$, which sets flip-flop K1 true (it enters PC#265 false) if the last character printed was not a decimal point (flip-flop A11 is false), nor (tab) (flip-flop A12 is false), and at least one of the following two conditions are present. The first condition is that the marker in the G register has indicated that the last character printed was represented binarily in period $O_0$, the least significant octal digit position, of the E register; in other words, the last digit of the word in the E register has been read out. The second condition occurs if the marker in the G register coincides with a "one" in the F register, thereby indicating that the character just printed shall be the last for this word, i. e., a "one" has been entered in the F register in a position labeled $\delta$ in Fig. 4. It is by this means that the programmer may cause reading out of only some of the most significant decimal digits in the E register. It is to be noted that, if the last character printed was a decimal point or (tab), summarily discontinuing read-out in this fashion for the word presently in the E register may not be done since printing both these characters is done prior to printing the character corresponding to the E register digit which these characters affect. That is, the logic of the invention is designed such that these characters shall not be the last printed in a word.

It is further noted that the $k_1$ equation is not effective when the number information (Fig. 5) is passing through arithmetic unit 114 (i. e., during period $O_{12}$). Thus, after providing for printing of the number information, flip-flop K1 remains false and a count to PC#266 is made. In other words, at least one character corresponding to the magnitude of a number must be printed before the test may be performed and further printing not done.

It is the function of the operations performed during PC#266 to provide for entering a decimal point in the sequence of digits from the computer and for tabulating the typewriter, if either of these is called for by a "one" in the F register in a binary digit position labeled $\beta$ or $\gamma$. These operations are included here to insure that they will occur prior to printing the E register digit indicated by the marker in the G register as the next to be set up in flip-flops A1 to A6.

Referring to the equations for this word time block, it is noted that the marker in the G register, which can be positioned only in a binary digit position thereof labeled $\delta$, causes flip-flop A7 to be true only for the next binary digit position, labeled $\gamma$, as represented by the equations $a_7=G_6C$ and ${}_0a_7=G_5'C$ and the resultant state of flip-flop A7 causes flip-flop A8 to be true only for the following binary digit position, labeled $\beta$, as represented by the equations $a_8=A_7C$ and ${}_0a_8=A_7'C$. As will be seen, only when flip-flop A7 is true (i. e., at a $\gamma$ position), can a "one" in the F register cause the typewriter to tabulate and only when flip-flop A8 is true (i. e., at a $\beta$ position), can a "one" in the F register cause the printing of a decimal point. Thus, if both a tabulation and the insertion of a decimal point are called for prior to printing an E register digit, the former is accomplished first.

Flip-flop A11 is employed as a control for the insertion of a decimal point (Fig. 14) and, when true, will be shown to cause flip-flops A1 to A6 to become set up with the corresponding code during PC#262. Thus, note that in the equation $a_{11}=A_8A_{11}'A_{12}'F_1C$, the $A_8$ and $F_1$ terms preclude triggering flip-flop A11 true unless at a $\beta$ position in which there is a "one" in the F register editing code.

Flip-flop A12 is employed as a control for directing the typewriter to tabulate (Fig. 14) and, when true, will be shown to cause flip-flops A1 to A6 to become set up with the corresponding code during PC#262. Thus, note that in the equation $a_{12}=A_7A_{11}'A_{12}'F_1C$, the $A_7$ and $F_1$ terms preclude triggering flip-flop A12 true unless at a $\gamma$ position in which there is a "one" in the F register editing code.

It should be apparent that, for the same E register digit, a decimal point and a tabulation may both be called for by "ones" in the $\beta$ and $\gamma$ positions of the F register. An occasion for this is where the E register digit is the first of a group which represents a fractional number. In such case, the tabulation is done first, the decimal point is printed next, then the E register character is printed. This sequence occurs because flip-flop A12 (tabulation) is capable of being set true before flip-flop A11 (decimal point), and thus the $A_{12}'$ term in the $a_{11}$ equation prevents flip-flop A11 from going true. After the typewriter tabulates, the equation ${}_0a_{12}=A_7A_{12}C$ sets flip-flop A12 false, permitting the $a_{11}$ equation to be effective, if otherwise satisfied, thereby providing for insertion of the decimal point.

The $A_{11}'$ term in the $a_{11}$ equation and the $A_{11}'A_{12}'$ term in the $a_{12}$ equation, it should be noted, precludes consecutive tabulations and printing of consecutive decimal points. It is apparent that these operations are not appropriate to the proper presentation of business data.

Thus, when the computer enters PC#262, flip-flops A1 to A9 are all false, flip-flop A11 is true only if the character to be next printed is a decimal point and flip-flop A12 is true only if the next operation is to be a tabulation.

In PC#262, as in PC#266, the marker in the G register is effectively shifted by means of flip-flops A7 and A8. Further, in a similar manner, by employing flip-flop A9, the effective shift is carried another binary digit positon to the left of the regster to a position labeled $\alpha$.

Flip-flop A10, it will be noted from Fig. 14, acts as a control for suppression of zeros, i. e., if flip-flop A10 is true during PC#262, and a digit "0" is sensed in the E register, flip-flops A1 to A6 will be set up with the code for (space), as will be shown. Further, it will be recalled that flip-flop A10 was preset true prior to entering the editing and printing subroutine and has not been triggered otherwise thus far during the first excursion through the subroutine. As a consequence, for the first sequence through the subroutine, after the printing of the number information, the true status of flip-flop A10 causes the typewriter to space instead of printing zeros which may precede significant digits in the E register or editing symbols otherwise relevant. As will also be shown, for subsequent sequences through the subroutine, flip-flop A10 will be false on entering PC#262 only if the next character to be printed is a significant digit set up in the E register or a decimal point.

Further discussion of flip-flop A10 is reserved to follow a discussion of flip-flops A1 to A6 during PC#262.

It is to be noted that when PC#262 is first entered, information set up in periods $O_{12-13}$ of the E register (sign and overflow) has already been printed, if called for, or the typewriter caused to space if this information is to be suppressed. Therefore, in the following discussion, the last three codes of Fig. 7 are not considered. It follows that flip-flops A1 to A6 are to be set up with the codes for information set up in periods $O_{0-11}$ of the E register or with the codes for the editing symbols. In this connection, it is seen that none of the codes which are to be set up during the printing process for the remainder (periods $O_{0-11}$) of the word in the E register require that flip-flop A6 be true. Thus, flip-flop A6 remains false.

Next, it is noted that flip-flops A1 to A4 are set up as directed by the codes of Fig. 7 in accordance with the $\delta$, $\gamma$, $\beta$, and $\alpha$ positions of a digit in the E register. These positions are identified by the terms $G_5$, $A_7$, and $A_8$ in the first terms of the respective equations for flip-flops A1 to A4.

The equation $a_1 = A_{12}'(A_{11}'E_5G_5 + A_9A_{10})C$ provides for setting flip-flop A1 true for either one of two conditions. The first controls when neither a decimal point is to be printed (flip-flop A11 is false) nor a tabulate operation is to be done (flip-flop A12 is false). In this case, flip-flop A1 is controlled by the content of the E register corresponding to the G register marker ($E_5G_5$). Flip-flop A1 is thereby set true if the least significant binary digit of the coded decimal digit to be read out is a "one." The second condition will set flip-flop A1 true if flip-flop A10 is true at an $\alpha$ position, provided, as before, that flip-flop A12 is false, the true state being required by the code for causing the typewriter to space.

Flip-flop A2, it is noted from its equation, is set true if the character to be printed is a decimal point (flip-flop A11 is true), as required by the decimal point code of Fig. 7.

Flip-flops A3, A4, and A5 are set true if the character to be printed is a decimal point (flip flop A11 is true) or if the typewriter is to space (flip-flop A10 is true at an $\alpha$ position) or tabulate (flip-flop A12 is true), as reference to the respective codes of Fig. 7 will indicate.

Again consider flip-flop A10, which, as stated, is the control for suppressing zeros. This flip-flop is set false by the equation ${}_0a_{10} = A_8(A_1 + A_2 + E_4 + E_5)C$, prior to an $\alpha$ position (in this case, at the $\beta$ position when flip-flop A8 is true), since it is at the $\alpha$ position that it is set true in accordance with the $a_{10}$ equation if zero suppression is to recommence for the next group of digits. The ${}_0a_{10}$ equation indicates that this is to be done if flip-flop A1 or A2 is true or if there is a "one" in the E register in the $\alpha$ or $\beta$ positions since this would indicate that the code stored in flip-flops A1 to A6 is for a decimal numeral other than zero or a decimal point (i. e., a decimal numeral set up in the E register or a decimal point is to be read out).

Since it may be required to suppress zeros more than once during the read-out of a word, provision is made to reset flip-flop A10 to the true state if the F register contains a "one" in an $\alpha$ position. Thus, note that the equation $a_{10} = A_9A_{11}'A_{12}'F_1C$ sets flip-flop A10 true at the fall of a clock pulse occurring when flip-flop A9 is true (at an $\alpha$ position) and there is a "one" in the F register editing code. It is to be noted that the above $a_{10}$ equation is effective subsequent to the setting up of flip-flops A1 to A6 with the code for the E register digit corresponding to the "one" in the F register.

Lastly, in PC#262, flip-flop K1 is set false for a count to PC#263, where, as already pointed out, the information set up in flip-flops A1 to A6 is transmitted to the typewriter for printing.

It should now be apparent after having described in detail each of the word blocks shown in the flow diagram of Fig. 13 that certain operations and, therefore, certain forms of the proposition equations occur repeatedly in several of the word time blocks. As should be apparent, it is not necessary to repeatedly generate a logical combination of terms, since the combination may be logically multiplied by the program counter numbers which define when it is to be operative.

Figs. 11, 23, 24, and 25 may be referred to for the final composite equations and diode networks which have been devised for completely defining the action of each of the logical output propositions mentioned in connection with Fig. 1. It should be understood, of course, that only a portion of the composite network is made operative at a time. This portion is determined by which of the outputs of program counter 115 is at the high potential.

An illustration of the editing and printing operation of the present invention will next be given with particular reference to Figs. 16 through 22 which concern moneys handled by a retail store for a customer's charge account as indicated by cash register entries.

The command of Fig. 16, contained in the H register, is seen to comprise the instruction "read out decimally to typewriter" represented by a code which is identified in the "command identification" routine (Fig. 12) and causes the computer to be sequenced to the subroutine designated "set up a word for read out." Here, the addresses specified in the $m_1$ and $m_2$ portions of the H register are looked up. The contents of the address 1200, which represents the first word to be read out, are transferred to the E register and appear as shown in Fig. 17. The contents of the address 0300, which represents the editing code, are transferred to the F register and appear as shown in Fig. 19. Also, flip-flops A7, A8, A9, A11, A12, and K1 are set false and flip-flops A1 to A6 and A10 are set true. The computer then enters PC#253, the first word time block of the editing and printing operation.

The first operation to be performed is to read out and print the number information encoded as 00 in period $O_{12}P_{0-1}$ since this number is positive without overflow. Thus, a marker "one" is set up in position $O_{12}P_0$ of the G register.

In PC#254, flip-flops A2 and A6 are triggered false and the resulting code set up in flip-flops A1 to A6 corresponds to that for (space) (Fig. 7).

During PC#s' 263 and 264, the typewriter receives the (space) code, the space bar is depressed and the computer program counter delays until signaled to count by the typewriter.

In PC#265, the marker is shifted to position $O_{10}P_2$, of the G register, thereby identifying the first decimal digit to be read out, which, it is seen, occupies period $O_{10}P_2$—$O_{11}P_2$ of the E register and flip-flops A1 to A6 are set false, corresponding to the code for "0". Flip-flop K1 remains false (the test for last digit is not made) and the computer enters PC#266.

In PC#266, because the G register marker is at $O_{10}P_2$, flip-flop A7 is true at $O_{11}P_0$ and flip-flop A8 is true at $O_{11}P_1$. Since there is no "one" in the F register for these positions, flip-flops A12 and A11 remain false, i. e., tabulation and decimal point insertion, respectively, are not done.

In PC#262, flip-flop A7 is true at $O_{11}P_0$, flip-flop A8 is true at $O_{11}P_1$ and flip-flop A9 is true at $O_{11}P_2$. Flip-flop A10 (zero suppression) stays true. Flip-flops A1, A3, A4, and A5 are set true and thus the code set-up corresponds to (space). Thus, although the most significant digit of the word in the E register is zero, it is automatically suppressed and the typewriter prints a space.

The marker is moved to position $O_9P_1$ of the G register. The test for the last digit fails. The E register indicates that the next digit is also "0"; however, the code in the F register (Fig. 19) requires that a decimal point be printed prior to this "0". In PC#266 flip-flop A11 is set true and flip-flop A12 remains false.

In PC#262, flip-flops A2 to A5 are triggered true, thereby setting up the code for printing a decimal point. The setting up of the decimal point code causes flip-flop A10 to be triggered false. The decimal point is printed.

Since the digit "0" of the E register must now be provided for, the G register marker is not shifted (it remains at $O_9P_1$ due to recirculation of the G register). Flip-flop A11 is reset false. Since none of the flip-flops A1 to A6 are triggered true, and A10 is now false, the resultant code therein corresponds to a digit "0," which is printed.

The two succeeding E register digits "5" and "0" are also printed; and, by this time, the G register marker has been moved to position $O_6P_2$, thereby identifying the "0" set up in period $O_6P_2$—$O_7P_2$ of the E register.

A "one" occurs in the F register at $O_7P_2$, indicating that the digit "0" of the E register is the last of a group to be printed. In other words, it is desired to recommence zero suppression prior to printing the next characters. Thus, in PC#262, flip-flop A10 is triggered true at $O_7P_2$. This does not affect the printing of the digit "0" since the triggering occurs subsequent to setting up flip-flops A1 to A6 with the code corresponding to "0."

Figure 22:
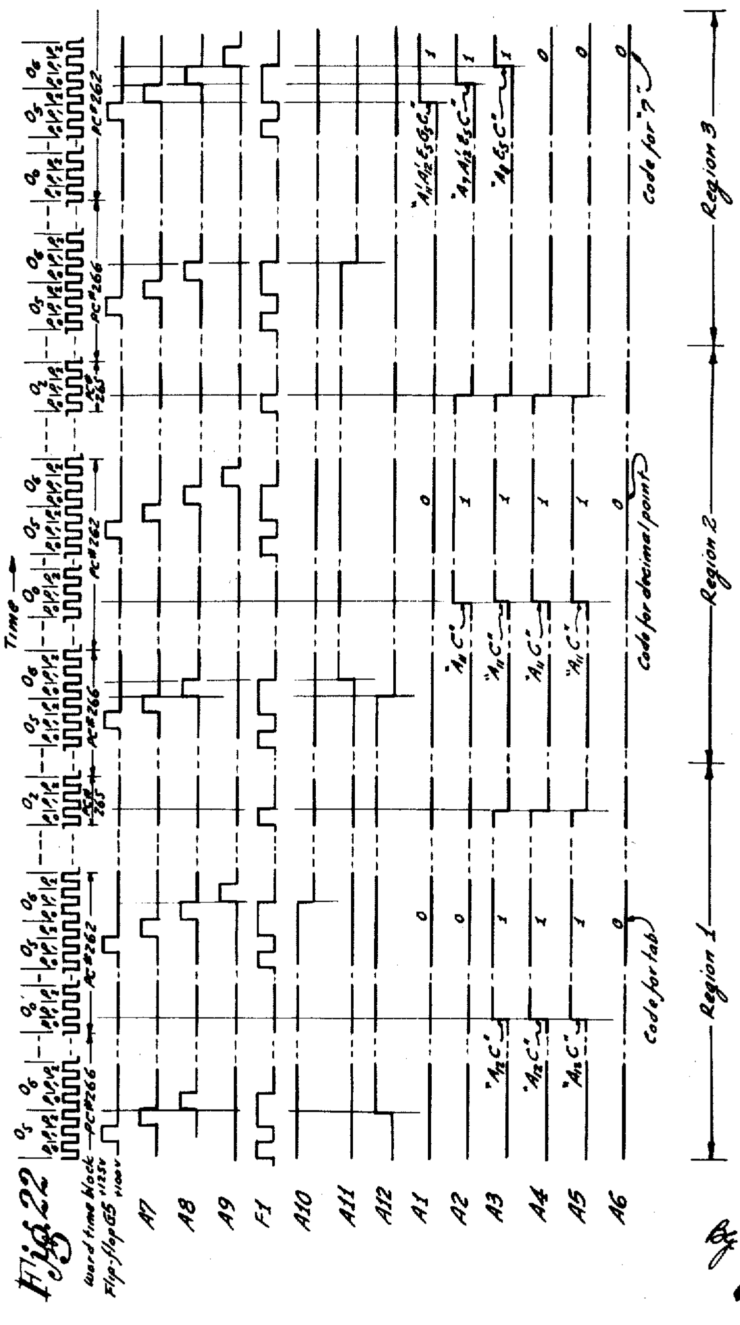
Fig. 22 is a graph showing how part of the editing is accomplished for the example of the word of Fig. 17.
Figure 23:
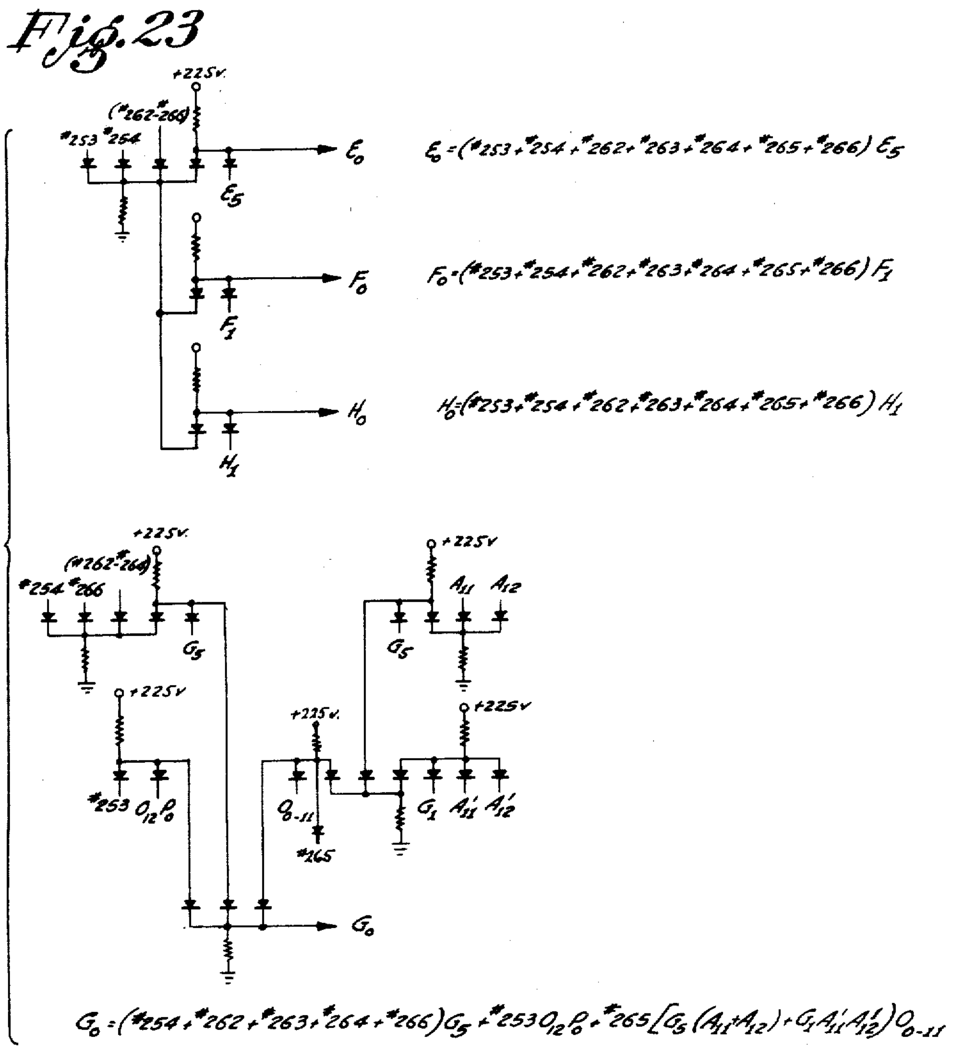
Fig. 23 shows the diode networks for generating the equations for propositions $E_0$, $F_0$, $G_0$, and $H_0$.
Figure 24:
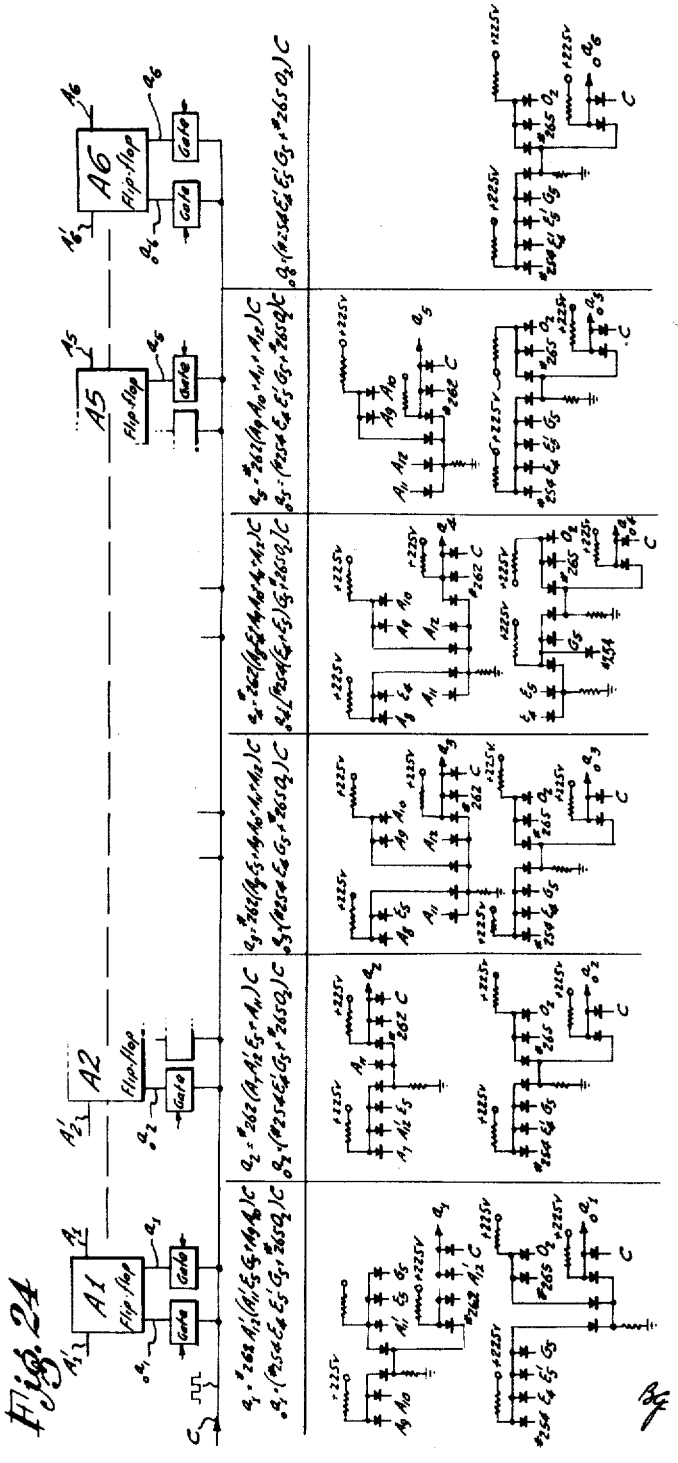
Figs. 24 and 25 show the block diagrams, logical triggering equations, and diode networks for flip-flops A1 to A6 and A7 to A12, respectively.
Figure 25:
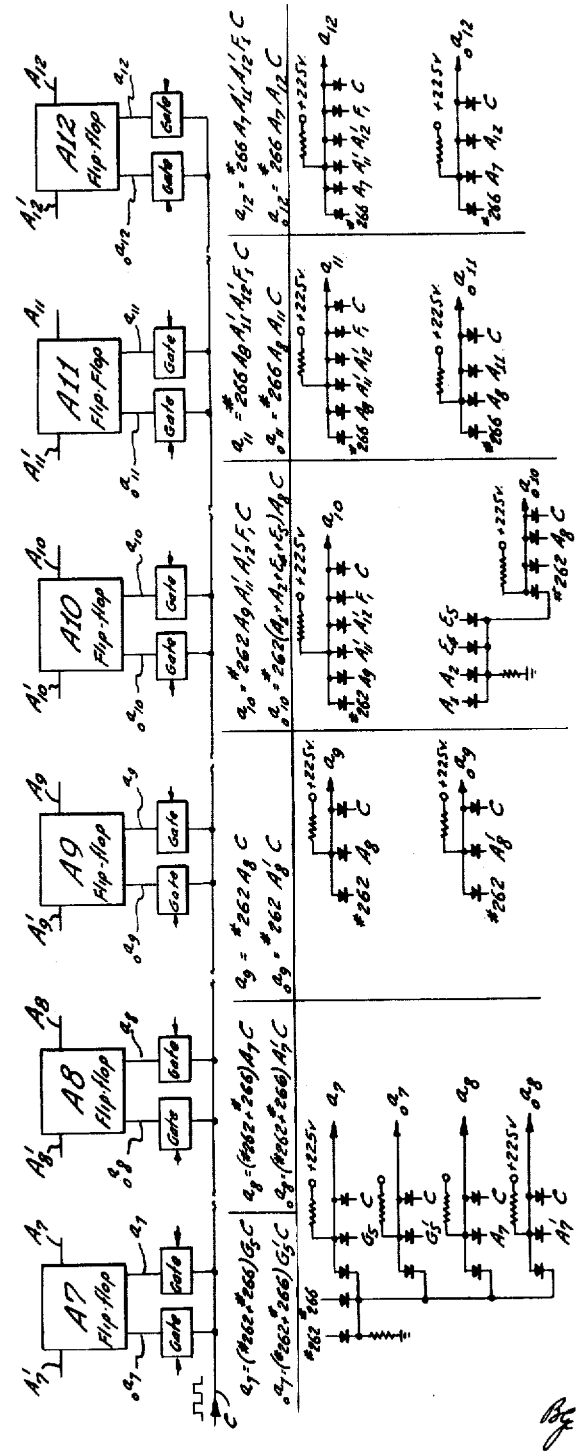

The G register marker is shifted to $O_5P_1$ (region 1 of Fig. 22). The F register indicates that two operations are to occur prior to printing the next E register digit, "7," which occupies period $O_5P_1$ to $O_6P_1$. These are the insertion of a decimal point and a tabulation. Graphs showing the flip-flop activity for these operations are printed in Fig. 22. The tabulation is provided for first. In PC#266, it is seen that the marker is stepped at $O_5P_3$ into flip-flop A7 thereby, at $O_6P_0$, setting flip-flop A12 true, preventing flip-flop A11 from going true. Thus, during PC#262, flip-flop A12 is true and flip-flop A11 is false. The term $A_{12}C$ of the equations for flip-flops A3 to A5 operates to trigger them true, thereby setting up the code for tabulating in flip-flops A1 to A6. The typewriter tabulates.

Provision is now made for entering the decimal point called for in $O_6P_0$ of the F register code (region 2 of Fig. 22).

The G register marker remains in $O_5P_1$. Flip-flop A12 is set false and flip-flop A11 is set true during PC#266. Thus, during PC#262, flip-flops A1 to A6 are set up with decimal point code by the "$A_{11}C$" terms of the equations for flip-flops A2 to A5.

After printing the decimal point, flip-flop A11, in PC#266, is set false.

Subsequently, as region 3 of Fig. 22 shows, the code for the E register digit, "7," is set up in flip-flops A1 to A6 by operation of the indicated terms of the equations for flip-flops A1 to A3 and this digit is printed.

The procedure for printing and editing the remainder of the E register word may be similarly derived. It is noted that when the last digit, "9," is printed, the G register marker pulse will occupy position $O_0P_0$ and, for reasons already stated, flip-flops A11 and A12 will both be false during PC#265. Thus, flip-flop K1 will be triggered true and a program counter skip to the subroutine "test for last word" will occur (Fig. 12). Since the word occupying memory address 1201 is also to be read out, a unit will be subtracted from the $m_3$ portion of the H register (which indicates the number of words to be read out), thereby reducing this number to zero; and this word will be set up for read-out, edited in accordance with the same editing code as the prior word, and printed. The format of the two words, when printed, will appear on the typewriter paper as shown in Fig. 21 and may be compared with the non-edited presentation of these words shown in Fig. 20. Subsequent to reading out both words, the test for the last word will succeed and the computer will sequence back to the command identification routine.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A read-out system, comprising a memory for storing coded signals representing characters and editing symbols to be read out, a set of coded signals representing a plurality of editing symbols capable of being associated with the coded signals representing each character; sensing means responsive to the coded signals representing both editing symbols and characters in a predetermined sequence and having an output corresponding to each of the coded signals sensed; and signals generating means responsive to the output of said sensing means to become energized in accordance with the coded signal corresponding to the output.

2. In a read-out system from a digital computer memory, means to edit the read-out, comprising a first store for signals representing digits of a word to be read out; a second store for signals representing editing instructions to be read out; a third store capable of being sequentially set up in accordance with the signals in said first and second stores; means interconnecting said registers being so constructed and arranged that the representation of editing instructions are properly interspersed with the representation of digits; a plurality of output lines, each line corresponding to a digit or an editing instruction; and means for energizing one of said output lines at a time in accordance with the information set up in said third store.

3. A system for transference of information from the cyclical memory of a computer to a printer, comprising a first one-word recirculating register synchronized to advance with the memory for storing binary information to be printed; a second one-word recirculating register synchronized to advance with the memory for storing a marker pulse; a third one-word recirculating register synchronized to advance with the memory for storing editing symbols corresponding to the information in said first recirculating register; storage means; means to sequentially set up said storage means in accordance with information found in said first and third recirculating registers corresponding with the position of the marker pulse in said second recirculating register; a plurality of output lines from said storage means, each corresponding to a digit or editing symbol to be printed; and means for shifting the position of the marker pulse in said second recirculating register after setting up said storage means in accordance with information in said first and third recirculating registers.

4. In a system for transference of digits from the memory of a computer to an automatic typewriter, means to intersperse among the coded signals representing the digits as they are transferred other coded signals effective to cause the typewriter to perform preselected editing operations, comprising a first register capable of being set up with coded signals representing the digits as derived from the computer memory; a second register capable of being set up with coded signals representing the editing operations; a third register having a plurality of outputs, one of which is energized in accordance with the coded signals set up therein; and means to select from among the coded signals in said first and second registers signals for setting up said third register.

5. In a system for transferring information from a computer to an automatic typewriter controlled thereby, the computer having a cyclical memory in which digits of the information are stored as individual coded signals and the typewriter being capable of detecting the coded signals to print characters representing the digits, comprising first and second registers timed to advance with the memory; means to set up said first register with coded signals representing the digits of the information; means to set up said second register with coded signals representing instructions for operating the typewriter, particular instructions being arranged to correspond with each digit in said first register; storage means capable of being set up sequentially with coded signals representing a digit from said first register or an instruction from said second register; a network to select, for setting up next in said storage means, between the coded signals representing a digit and the coded signals representing the instructions corresponding thereto; and means to convey the coded signals set up in said storage means to the typewriter.

6. A computer read-out system comprising a cyclical memory; a first register associated with said memory for storing signals representing a word to be read out; a second register associated with said memory for storing signals representing editing instructions for the word stored in said first register; a storage register including a network for generating read-out signals in accordance with the signals set-up therein; and means for sequentially setting up said storage register with signals representing digits from said first register properly interspersed with signals representing read-out instructions from said second register.

7. A communication system operative to transfer information from a computer to an automatic typewriter controlled thereby, the computer having a cyclical memory in which each digit of each word of the information together with editing instructions therefor are stored as coded signals and the typewriter having a detector capable of identifying each of a plurality of coded signals to cause the activation of a character key corresponding thereto, comprising first and second recirculating registers timed by the memory, each register having a capacity of one word and each register having an output; means to set up said first register with the coded digit signals of a word from the memory; means to set up said second register with coded editing signals to correspond in timed sequence with selected coded digit signals in said first register; circuit means timed by the memory to respond to a predetermined manner to the coded signals of said first and second register to generate digit and editing signals; and means to serially transmit the signals generated by said circuit means to the detector of said typewriter.

8. In a read-out system from a digital computer memory, means to edit the read-out, comprising a first store for signals representing digits of a word to be read out; a second store for signals representing editing instructions to be read out; a third store capable of being sequentially set up in accordance with the signals in said first and second stores, whereby the representation of editing instructions is properly interspersed with the representation of digits; a fourth store containing a marker signal; means to set up said third store in accordance with the information found in positions of said first and second stores corresponding to the marker signal in said fourth store; a plurality of output lines, each line corresponding to a digit or an editing instruction; and means for energizing one of said output lines at a time in accordance with the information set up in said third store.

9. In a read-out system from a digital computer memory, means to edit the read-out, comprising a first store for signals representing digits of a word to be read out; a second store for signals representing editing instructions to be read out; a third store capable of being sequentially set up in accordance with the signals in said first and second stores, whereby the representation of editing instructions is properly interspersed with the representation of digits; a fourth store containing a marker signal; means to set up said third store in accordance with information found in positions of said first and second stores corresponding to the marker signal in said fourth store; a plurality of output lines, each line corresponding to a digit or an editing instruction; means for energizing one of said output lines at a time in accordance with the information set up in said third store; and means for shifting the marker signal in said fourth store to a position corresponding to the signals in said first store representing the next digit to be read out, said shifting means being operable after energizing said output lines in accordance with information representing a digit or information representing particular editing instructions.

10. In a read-out system from a digital computer memory, means to edit the read-out, comprising a first store for signals representing digits of a word to be read out; a second store for signals representing editing instructions to be read out; a third store capable of being sequentially set up in accordance with the signals in said first and second stores, whereby the representation of editing instructions is properly interspersed with the representation of digits; a fourth store containing a marker signal; means to set up said third store in accordance with information found in positions of said first and second stores corresponding to the marker signal in said fourth store; timing means to set up said third store in predetermined sequence when a plurality of signals representing editing instructions are set up in said second store corresponding to the signals representing the same digit set up in said first store; a plurality of output lines, each line corresponding to a digit or an editing instruction; means for energizing one of said output lines at a time in accordance with the information set up in said third store; and means for shifting the marker signal in said fourth store to a position corresponding to the signals in said first store representing the next digit to be read out after energizing said output lines in accordance with information representing a digit or information representing particular editing instructions.

11. In a read-out system from a digital computer memory, means to edit the read-out, comprising a first storage device for groups of signals, each group representing a digit to be read out; a second storage device for sets of signals, a set corresponding to each group of signals of said first storage device and each signal of a set representing an editing instruction; generating means responsive to the signals in said second storage device to generate a code corresponding to each signal in accordance with its position in the set; a flip-flop register capable of being sequentially set up in accordance with a group of signals in said first storage device or with the code generated by said generating means whereby the representation of editing instructions is properly interspersed with the representation of digits; a plurality of output lines, each line coresponding to a digit or an editing instruction; and means for energizing one of said output lines at a time in accordance with the information set up in said flip-flop register.

12. A read-out system for transferring coded information representing digits and instructions, from the memory of a computer to a printer capable of printing a character or performing an operation for each coded digit and coded instruction received, the coded digits and coded instructions being interspersed in transmission in accordance with a preferred presentation of characters, comprising a first register synchonized by the memory and storing coded digit signals; a second register synchronized by the memory and storing coded instruction signals corresponding to selected coded digit signals in said first register; a static register for storing individual coded information signals in sequence and having a plurality of outputs, one to correspond with each coded information signal capable of being stored; and circuit means responsive to signals fed back from the printer for controlling the successive setting up of said static register with coded information from said first and second registers.

References Cited in the file of this patent

UNITED STATES PATENTS

| | | |
|---|---|---|
| 2,604,262 | Phelps et al. | July 22, 1952 |
| 2,652,196 | Sterling | Sept. 15, 1953 |
| 2,652,554 | Williams et al. | Sept. 15, 1953 |
| 2,679,638 | Bensky et al. | May 25, 1954 |
| 2,721,990 | McNaney | Oct. 25, 1955 |